(12) United States Patent
Yoon et al.

(10) Patent No.: US 8,767,051 B2
(45) Date of Patent: Jul. 1, 2014

(54) DISPLAY APPARATUS, 3D GLASSES, AND DISPLAY SYSTEM INCLUDING THE SAME

(75) Inventors: Hyun-jin Yoon, Seoul (KR); Tae-don Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 463 days.

(21) Appl. No.: 12/981,267

(22) Filed: Dec. 29, 2010

(65) Prior Publication Data

US 2011/0254934 A1  Oct. 20, 2011

(30) Foreign Application Priority Data

Apr. 16, 2010  (KR) ........................ 10-2010-0035342

(51) Int. Cl.
*H04N 13/04* (2006.01)
(52) U.S. Cl.
CPC .................................... *H04N 13/04* (2013.01)
USPC .......................................................... 348/51
(58) Field of Classification Search
USPC ................................................... 348/41–161
See application file for complete search history.

(56) References Cited

U.S. PATENT DOCUMENTS

| 5,293,227 | A * | 3/1994 | Prince ............................. 348/53 |
| 6,188,442 | B1 * | 2/2001 | Narayanaswami ........... 348/564 |
| 2003/0026461 | A1 * | 2/2003 | Arthur Hunter ............... 382/114 |
| 2004/0056948 | A1 * | 3/2004 | Gibson ........................... 348/56 |
| 2007/0263003 | A1 * | 11/2007 | Ko et al. ........................ 345/502 |
| 2008/0060025 | A1 * | 3/2008 | Chen ............................... 725/74 |
| 2010/0007582 | A1 * | 1/2010 | Zalewski .......................... 345/8 |
| 2011/0122237 | A1 * | 5/2011 | Hong .............................. 348/56 |
| 2011/0157327 | A1 * | 6/2011 | Seshadri et al. ................ 348/51 |

FOREIGN PATENT DOCUMENTS

EP  2 169 967 A2  3/2010

OTHER PUBLICATIONS

Communication dated Nov. 3, 2011, issued by the European Patent Office in corresponding European Patent Application No. 11161905.2.

\* cited by examiner

*Primary Examiner* — Sath V Perungavoor
*Assistant Examiner* — Talha Nawaz
(74) *Attorney, Agent, or Firm* — Sughrue Mion, PLLC

(57) ABSTRACT

A display apparatus, three-dimensional (3D) glasses, and a display system including the display apparatus and the 3D glasses are provided. The 3D glasses which interwork with an external display apparatus include: a wireless receiver which receives a sync signal and audio signals from the external display apparatus; a shutter driver which drives shutters according to the received sync signal; and an audio output part which processes and outputs the received audio signal. Thus, users can individually enjoy contents without interfering with one another by selecting and listening to audio corresponding to an image viewed through the display apparatus.

15 Claims, 8 Drawing Sheets

DISPLAY APPARATUS, 3D GLASSES, AND DISPLAY SYSTEM INCLUDING THE SAME

CROSS-REFERENCE TO RELATED APPLICATION

This application claims priority from Korean Patent Application No. 10-2010-0035342, filed Apr. 16, 2010 in the Korean Intellectual Property Office, the disclosure of which is incorporated herein in its entirety by reference.

BACKGROUND

1. Field

Exemplary embodiments relate to a display apparatus, three-dimensional (3D) glasses, and a display system including the same. More particularly, exemplary embodiments relate to a display apparatus, 3D glasses, and a display system including the display apparatus and the 3D glasses interworking for efficient transmission and reception of audio signals.

2. Description of the Related Art

As three-dimensional (3D) technology advances, a variety of devices using 3D image technology are emerging. Representative examples include a 3D production device such as 3D camera, a 3D television (TV) for watching a 3D image, and 3D glasses for realizing a stereoscopic image in association with the 3D TV.

Recently, entertainment contents such as movies and documentaries have been produced using the 3D technology, garnering attention throughout the world. In particular, recent movies produced in 3D have achieved record-breaking success. Moreover, entertainment companies developing the 3D contents are entering more intense competition, and companies manufacturing 3D image devices are eager to acquire the relevant technology advances.

Furthermore, 3D images are now broadcast to people's homes, and 3D image providing apparatuses are in supply. In this respect, viewers are demanding improvements in 3D image quality and increased convenience in 3D viewing.

A system for viewing the 3D image at home mainly includes a 3D image providing apparatus such as a 3D TV, and 3D glasses for representing the stereoscopic image in association with the 3D image providing apparatus. The 3D image providing apparatus and the 3D glasses interwork in a restricted space and provide the stereoscopic image to the viewer.

Meanwhile, using the 3D image providing apparatus interworking with the 3D glasses, different contents can be provided to a plurality of users. However, while the plurality of the users can view the different contents by controlling the 3D glasses with respect to the images, it is hard to provide different audios to the plurality of the users.

SUMMARY

An aspect of an exemplary embodiment provides a display apparatus interworking with three-dimensional (3D) glasses to produce audio suitable for a provided image.

An aspect of another exemplary embodiment provides 3D glasses interworking with a display apparatus which provides images for a plurality of contents, wherein the 3D glasses can select and output an audio suitable for the provided image.

An aspect of another exemplary embodiment provides a display system allowing a plurality of users viewing a plurality of images respectively, to select and listen to an audio suitable for the image.

According to an aspect of an exemplary embodiment, there are provided shutter glasses which interwork with an external display apparatus, the shutter glasses including: a wireless receiver which receives a sync signal and audio signals from the external display apparatus; a shutter driver which drives shutters according to the received sync signal; and an audio output part which processes and outputs one of the received audio signals.

When the external display apparatus displays a plurality of images corresponding to different contents, the shutter driver may drive the shutters based on the sync signal to represent only one of the images to a user.

The audio signals may be of a plurality of channels corresponding to the plurality of the images, and the audio output part may output the audio signal corresponding to the image represented to the user, among the received audio signals of the plurality of the channels.

The shutter glasses may further include a channel selector which receives a channel selection from the user, and the audio output part may output the audio signal corresponding to the channel selected through the channel selector.

The external display apparatus may be a display apparatus alternately outputting the plurality of the images, and the sync signal may be a signal synchronized to an output timing of one of the images.

The shutters may include a left-eye shutter and a right-eye shutter, and the shutter driver may concurrently open the left-eye shutter and the right-eye shutter and concurrently close the left-eye shutter and the right-eye shutter according to the sync signal.

The wireless receiver may receive the audio signals according to ZigBee standard.

According to an aspect of another exemplary embodiment, there is provided a display apparatus which communicates with shutter glasses, the display apparatus including: a signal processor which signal-processes a plurality of images; a display part which outputs the processed images; and a communication part which transmits a sync signal and audio signals corresponding to the plurality of the images to the shutter glasses.

The display part may display the plurality of the images respectively corresponding to different contents.

The audio signals may be of a plurality of channels respectively corresponding to the plurality of the images.

The sync signal may be a signal synchronized to an output timing of one of the images.

The communication part may transmit the audio signals according to ZigBee standard.

According to an aspect of another exemplary embodiment, there is provided a display apparatus including: a receiver which receives a plurality of image signals and a plurality of audio signals respectively corresponding to the image signals; a display part which repeatedly outputs the received images in order; a sync signal generator which generates sync signals synchronized to an output timing of the image signals, respectively; a communication part which communicates with a plurality of external devices; and a controller which transmits the plurality of the audio signals and the plurality of the sync signals to the plurality of the external devices through the communication part.

The controller may synthesize the plurality of the audio signals in a multichannel, and transmit the synthesized signal to the plurality of the external devices through the communication part.

The controller may transmit the sync signal corresponding to one of the images and the audio signal corresponding to the one of the images at the same time.

The image received at the receiver may be an image wirelessly received from an outside, or an image received from an external device connected with the display apparatus by wire.

The sync signal may be a signal synchronized to an output timing of one of the images from the display part.

The plurality of the external devices may be 3D glasses, and the 3D glasses may interwork with the display apparatus.

According to an aspect of another exemplary embodiment, there are provided shutter glasses which interwork with an external display apparatus, the shutter glasses including: a wireless receiver which receives a sync signal and an audio signal from the external display apparatus; a shutter driver which drives shutters according to the received sync signal; and an audio output part which selects and outputs the audio signal of the image corresponding to the received sync signal.

The audio signal may be a signal synthesizing, into a multichannel, a plurality of audio signals respectively corresponding to a plurality of images output from the external display apparatus, and the audio output part may select one of the received multichannel audio signals and output the selected audio signal.

The shutter glasses may further include a channel selector which receives a channel selection from a user, and the audio output part may output the audio signal corresponding to the channel selected through the channel selector, among the multichannel audio signals.

The audio signal may correspond to the image corresponding to the received sync signal, and the audio output part may output the received audio signal as is.

The external display apparatus may be a display apparatus which alternately outputs the plurality of the images, and the sync signal may be a signal synchronized to an output timing of one of the images.

The shutter driver may drive the shutters based on the sync signal.

The shutters may include a left-eye shutter and a right-eye shutter, and the shutter driver may concurrently open the left-eye shutter and the right-eye shutter and concurrently close the left-eye shutter and the right-eye shutter according to the sync signal.

According to an aspect of another exemplary embodiment, there is provided a display system including: a display apparatus which alternately outputs a plurality of images; and shutter glasses which interwork with the display apparatus, wherein the display apparatus may transmit a sync signal and audio signals to the shutter glasses, and the shutter glasses may select and output the audio signal of the image corresponding to the received sync signal.

The audio signal may be a signal synthesizing, into a multichannel, a plurality of audio signals respectively corresponding to the plurality of the images output from the display apparatus, and the shutter glasses may select one of the received multichannel audio signals and output the selected audio signal.

The audio signal may correspond to the image corresponding to the sync signal received at the shutter glasses, and the shutter glasses may output the received audio signal as is.

The sync signal may be a signal synchronized to an output timing of one of the images output from the display apparatus, and the shutter glasses may control shutters according to the received sync signal.

According to an aspect of another exemplary embodiment, there is provided a display system including: a display apparatus which alternately outputs first and second images; first shutter glasses which interwork with the display apparatus to reproduce the first image; and second shutter glasses which interwork with the display apparatus to reproduce the second image, wherein the display apparatus transmits a first sync signal synchronized to an outputting timing of the first image, a second sync signal synchronized to an outputting timing of the second image, a first audio signal of the first image, and a second audio signal of the second image, and wherein the first shutter glasses output the first audio signal of the first image corresponding to the first sync signal, and the second shutter glasses output the second audio signal of the second image corresponding to the second sync signal.

According to an aspect of another exemplary embodiment, there is provided a method of controlling shutter glasses which interwork with an external display apparatus that alternately displays a first image corresponding to first content and a second image corresponding to second content, the method including: receiving, by the shutter glasses, a sync signal and an audio signal from the external display apparatus; driving shutters of the shutter glasses according to the received sync signal; and outputting the audio signal of an image corresponding to the received sync signal.

According to an aspect of another exemplary embodiment, there is provided a method of controlling a display apparatus which communicates with shutter glasses, the method including: alternately outputting, by the display apparatus, a first image and a second image; and transmitting, to the shutter glasses, a sync signal and first and second audio signals respectively corresponding to the first and second images.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
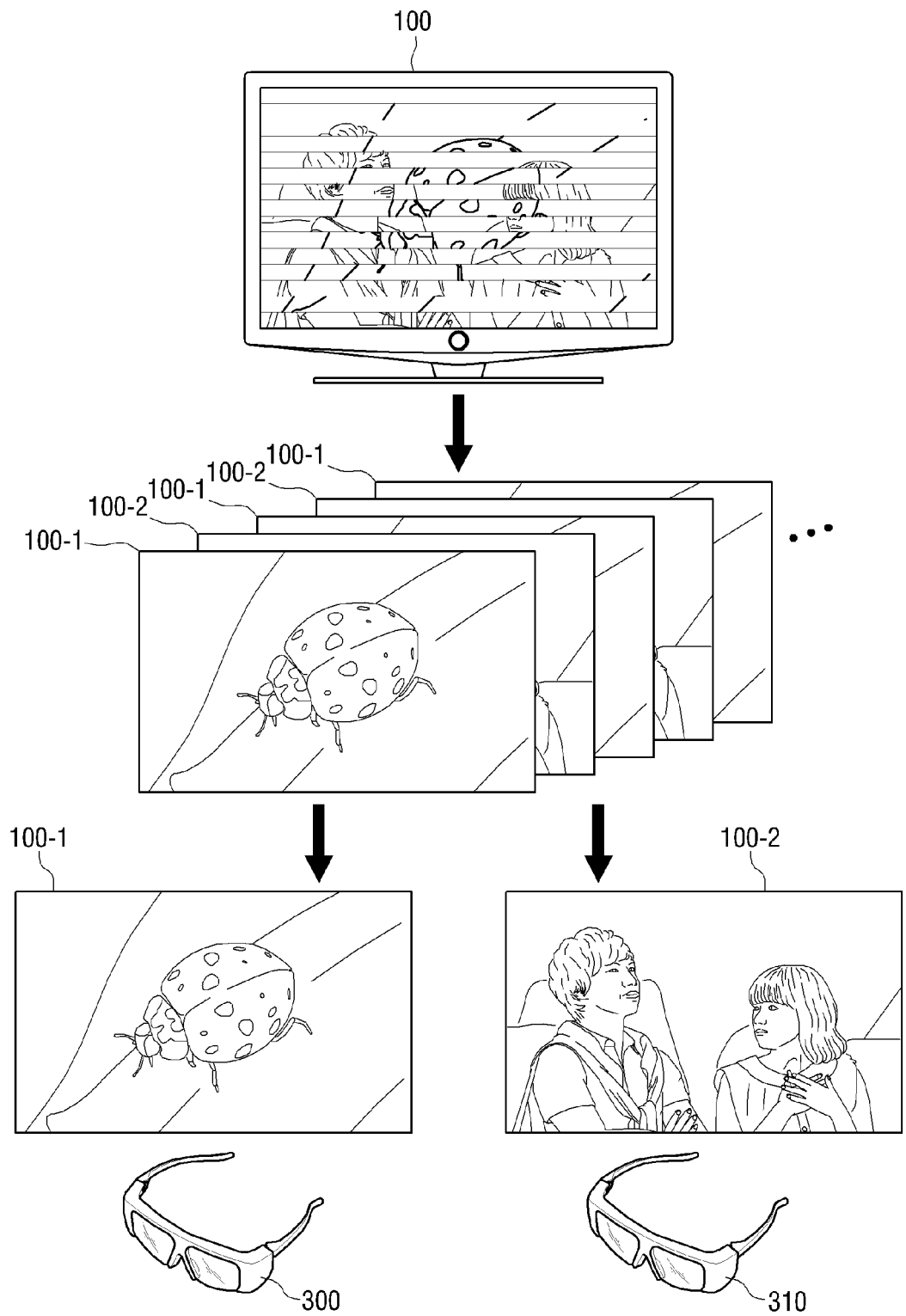
FIG. 1 is a diagram of a display system environment according to an exemplary embodiment.

Exemplary embodiments are described in greater detail below with reference to the accompanying drawings. In the following description, like drawing reference numerals are used for the like elements, even in different drawings. The matters defined herein, such as detailed construction and elements, are provided to assist in a comprehensive understanding of the exemplary embodiments. However, an exemplary embodiment can be practiced without those specifically defined matters. Also, well-known functions or constructions are not described in detail since they would obscure the exemplary embodiments with unnecessary detail.

FIG. 1 illustrates a display system environment according to an exemplary embodiment. Referring to FIG. 1, the display system includes a display apparatus 100 and a plurality of 3D glasses 300 and 310.

The display apparatus 100 alternately outputs a plurality of contents. That is, the display apparatus 100 alternately outputs different contents, other than a left-eye image and a right-eye image, and allows two or more users to view the different contents by simultaneously opening and closing a left-eye shutter and a right-eye shutter of two or more 3D glasses 300 and 310. Hereinafter, the mode for providing the different contents to two or more users by alternately outputting the different contents, other than the left-eye image and the right-eye image, is referred to as a dual view mode.

To provide a stereoscopic image service, the display apparatus 100 alternately outputs the left-eye image and the right-eye image, and transmits a sync signal synchronized with the outputting timing of the left-eye image and the right-eye image, to the 3D glasses using, for example, infrared rays. The 3D glasses 300 and 310 represent the stereoscopic image to the viewer by alternately opening and closing the left-eye shutter and the right-eye shutter based on the sync signal received from the display apparatus 100.

In the exemplary embodiment illustrated in FIG. 1, different images are alternately output in the dual view mode. Specifically, the display apparatus 100 alternately outputs first content 100-1 and second content 100-2. For example, the first content 100-1 and the second content 100-2 are alternately output in a display part of the display apparatus 100 based on a timing of 60 Hz, 120 Hz or 240 Hz.

The display apparatus 100 wirelessly sends the sync signal synchronized with the output timing of the first and second contents 100-1 and 100-2, to the respective 3D glasses 300 and 310. In more detail, the first sync signal synchronized to the timing of the first content 100-1 output in the display part of the display apparatus 100 is transmitted to the first 3D glasses 300 to view the first content 100-1, and the second sync signal synchronized to the timing of the second content 100-2 output in the display part of the display apparatus 100 is transmitted to the second 3D glasses 310 to view the second content 100-2. For example, the transmission is carried out using the infrared signals, radio frequency (RF) signals, or the like.

Based on the received first sync signal, the first 3D glasses 300 open at least one of the left-eye shutter and the right-eye shutter when the first content 100-1 is output in the display part of the display apparatus 100, and close the left-eye shutter and the right-eye shutter when the second content 100-2 is output in the display part of the display apparatus 100.

Likewise, based on the received second sync signal, the second 3D glasses 310 close the left-eye shutter and the right-eye shutter when the first content 100-1 is output in the display part of the display apparatus 100, and open at least one of the left-eye shutter and the right-eye shutter when the second content 100-2 is output in the display part of the display apparatus 100.

Through these operations, a user wearing the first 3D glasses 300 can view only the first content 100-1, and a user wearing the second 3D glasses 310 can view only the second content 100-2.

A different method from the image transmission corresponding to the plurality of the contents is used to transmit the audio. More specifically, since two or more users are enjoying the contents through the single display apparatus in the same space, different audio signals are not output at the same time. Accordingly, the display apparatus 100 according to an exemplary embodiment wirelessly sends a first audio signal corresponding to the first content 100-1 to the first 3D glasses 300, and a second audio signal corresponding to the second content 100-2 to the second 3D glasses 310.

According to another exemplary embodiment, the display apparatus 100 synthesizes the first audio signal corresponding to the first content 100-1 and the second audio signal corresponding to the second content 100-2 to a multichannel and transmits the multichannel audio signal to the plurality of the 3D glasses 300 and 310. Accordingly, the 3D glasses select a channel of the audio signal corresponding to the intended content so that the user can listen to the audio signal of the corresponding content. The audio signal corresponding to the selected channel is the audio signal included in the content corresponding to the received sync signal, i.e., the audio signal corresponding to the image represented to the user wearing the 3D glasses.

In the above description, while the display apparatus 100 may be an image output apparatus for providing 3D contents, such as a 3D display apparatus, it is understood that another exemplary embodiment is not limited thereto. For example, a display apparatus 100 according to another exemplary embodiment may be, but is not limited to, any display apparatus capable of alternately outputting a plurality of the contents other than a 3D image. Furthermore, while two 3D glasses 300 and 310 are illustrated in the system of FIG. 1, it is understood that a display apparatus 100 providing three or more contents can be applied to three or more 3D glasses in another exemplary embodiment.

Thus far, a display system for providing two or more contents has been illustrated. Hereinafter, a display apparatus 100 and 3D glasses 300 or 310 of the system are respectively described in detail.

Figure 2:
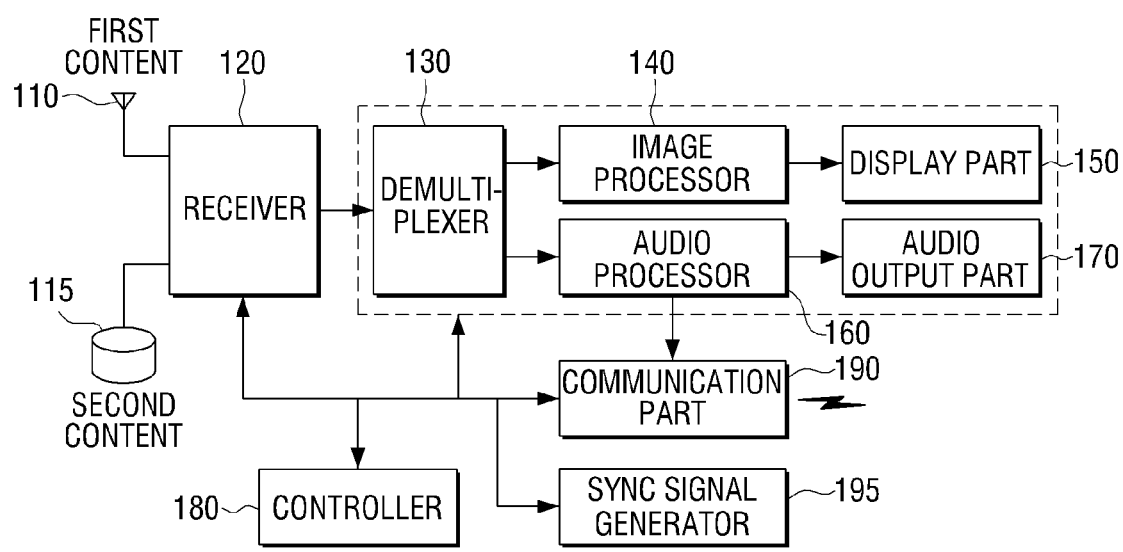
FIG. 2 is a block diagram of a display apparatus according to an exemplary embodiment.

FIG. 2 is a block diagram of a display apparatus 100 according to an exemplary embodiment. Referring to FIG. 2, the display apparatus 100 includes a receiver 120, a demultiplexer 130, an image processor 140, a display part 150, an audio processor 160, an audio output part 170, a controller 180, a communication part 190, and a sync signal generator 195.

The receiver 120 wirelessly receives image content via an antenna 110, or receives the image content via an external device 115 by wire. Herein, the external device 115 indicates a device capable of providing the image content, such as a digital video disc (DVD) player, a Blu-ray player, a set-top box, etc. Meanwhile, the received image content may include at least one of a 2D image and a 3D image, and two or more image contents can be received. The receiver 120 forwards the received image content to the demultiplexer 130.

The demultiplexer 130 splits the image content signal received from the receiver 120 to an image signal and an audio signal, and outputs the split signals to the image processor 140 and the audio processor 160, respectively. The image processor 140 decodes and converts the image signal split by the demultiplexer 130 to an image signal of a format of the display part 150, and outputs the converted image signal to the display part 150. The audio processor 160 decodes and converts the audio signal split by the demultiplexer 130 to an audio signal of a format of the audio output part 170, and provides the converted audio signal to the audio output part 170.

To transmit the audio signals of the plurality of the image contents to an external device, e.g., to shutter glasses, through the communication part 190, the audio processor 160 may synthesize the plurality of the received audio signals to a multichannel audio signal.

The display part 150 outputs the image signal provided from the image processor 140. In particular, when the image signals correspond to the plurality of the image contents in the dual view mode, the display part 150 can provide the plurality of the image signals to the plurality of the users by alternately outputting the plurality of the image signals.

The audio output part 170 outputs the audio signal received from the audio processor 160, to the user.

The controller 180 controls the overall operations of the display apparatus 100, and controls the receiver 120, the demultiplexer 130, the image processor 140, the display part 150, the audio processor 160, the audio output part 170, the communication part 190, and the sync signal generator 195.

The controller 180 controls the sync signal generator 195 to generate a sync signal synchronized to an output timing when the image signal received at the image processor 140 is output to the display part 150. The generated sync signal is transmitted to shutter glasses (such as shutter glasses) through the communication part 190. Also, the controller 180 operates to transmit the audio signals processed at the audio processor 160 to the external devices (such as shutter glasses) through the communication part 190, or to transmit the multichannel audio signal processed at the audio processor 160 to the external devices.

Under the control of the controller 180, the communication part 190 transmits the sync signal and the plurality of the audio signals to the external devices.

The sync signal generator 195 generates the sync signal synchronized to the timing of the image output in the display part 150 and sends the generated sync signal to the external device (such as shutter glasses) so that the display apparatus 100 and the external device can interwork with each other.

While the display apparatus 100 as described above transmits the sync signal and the audio signal to the external device through the communication part 190, the communication part 190 enables an Infrared Radio (IR) transmission, a Radio Frequency (RF) transmission, etc., when the sync signal generated at the sync signal generator 195 uses the IR signal, the RF signal, etc. In various exemplary embodiments, the communication part 195 can include an RF transmitter, an IR transmitter, etc., individually.

Figure 3:
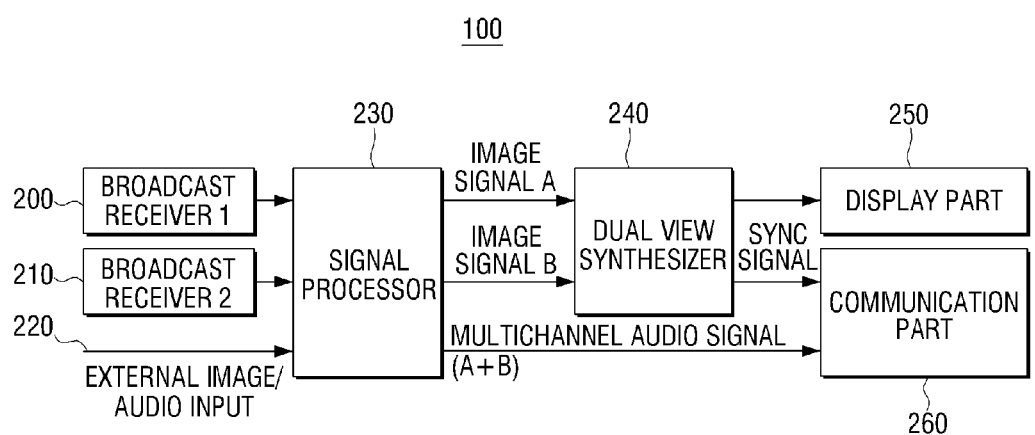
FIG. 3 is a diagram of operations of a display apparatus according to an exemplary embodiment.

FIG. 3 depicts operations of a display apparatus 100 according to an exemplary embodiment. Referring to FIG. 3, the display apparatus 100 includes a first broadcast receiver 200, a second broadcast receiver 210, a signal processor 230, a dual view synthesizer 240, a display part 250, and a communication part 260.

In the present exemplary embodiment, the display apparatus 100 includes the plurality of the receivers 200 and 210 for outputting two or more contents. Different broadcast contents can be received through the first broadcast receiver 200 and the second broadcast receiver 210, and a content including an image and audio may be received from an external device 220 connected by wire or by wireless. Herein, it is assumed that two contents including a content A and a content B are received.

The signal processor 230 splits the image signal and the audio signal in the plurality of the contents received from the plurality of the receivers 200, 210, and 220, converts the split image signal to an image signal displayable on the display part 250, and decodes the split audio signal to a reproducible audio signal. To transmit the audio signal to an outside, the signal processor 230 may extract the audio signals from the plurality of the contents, synthesize the extracted audio signals to a multichannel, and generate a multichannel audio signal.

That is, the signal processor 230 generates the multichannel audio signal A+B by synthesizing the audio signal A corresponding to the content A and the audio signal B corresponding to the content B in the multichannel, and wirelessly transmits the generated multichannel audio signal A+B to an external device (e.g., shutter glasses) through the communication part 260.

The dual view synthesizer 240 receiving the image signal A and the image signal B of the content A and the content B, respectively, processes the images to alternately output frames of the image signals. The dual view compound image A+B processed at the dual view synthesizer 240 is output through the display part 250. The image output through the display part 250 is an image with frames of the contents A and frames of the content B alternately output.

Thus far, a display apparatus 100 of a display system (such as illustrated in FIG. 1) has been described in detail. Hereinafter, 3D glasses 300 and 310 of the system are described in detail with reference to FIG. 4.

Figure 4:
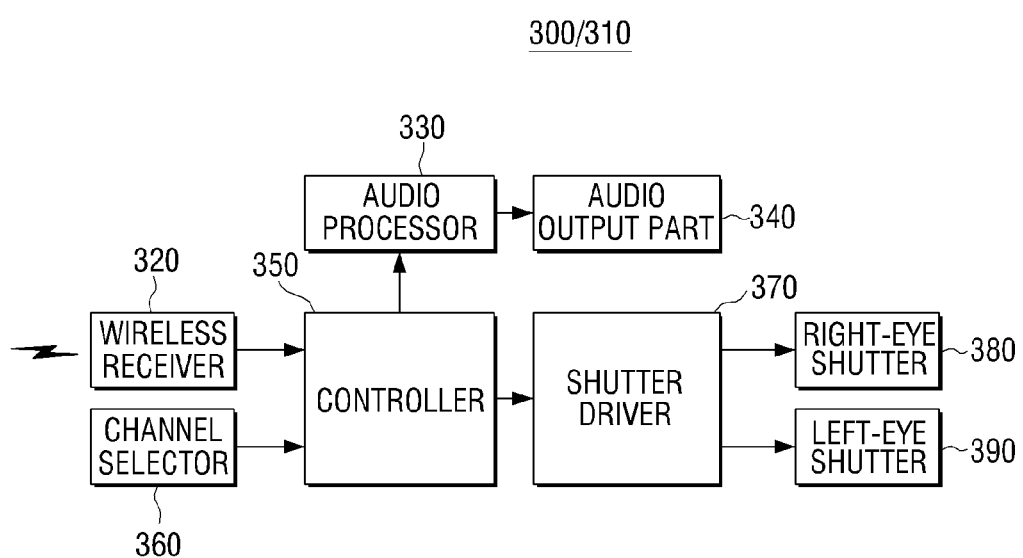
FIG. 4 is a block diagram of 3D glasses according to an exemplary embodiment.

FIG. 4 is a block diagram of 3D glasses 300 and 310 according to an exemplary embodiment. Referring to FIG. 4, the 3D glasses 300 and 310 include a wireless receiver 320, an audio processor 330, an audio output part 340, a controller 350, a channel selector 360, a shutter driver 370, a right-eye shutter 380, and a left-eye shutter 390.

The wireless receiver 320 wirelessly receives a sync signal and an audio signal from an external display apparatus 100. For example, the wireless receiver 320 can receive the sync signal through an RF signal or an IR signal, and receive the audio signal through an RF signal. The audio signal can be received, for example, according to the ZigBee standard.

Herein, the audio signal received via the wireless receiver 320 can be a multichannel audio signal synthesizing a plurality of audio signals in a multichannel, or a single audio signal.

The audio processor 330 processes and converts the received audio signal to a signal which can be output from the audio output part 340. For example, in the case of a multichannel audio signal, the audio processor 330 selects the audio signal corresponding to the channel selected by the channel selector 360, and provides the selected audio signal to the audio output part 340.

The audio output part 340 outputs the audio signal processed at the audio processor 330 to the user.

The controller 350 controls the audio processor 330 to output the audio signal, and controls the shutter driver 370 to open and close the right-eye shutter 380 and the left-eye shutter 390.

When the audio signal received from the wireless receiver 320 is the multichannel audio signal including the plurality of the audio signals, the channel selector 360 selects one of the audio signals. The audio signal selected by the channel selector 360 may be an audio signal selected according to a user's input, or an audio signal selected according to the received sync signal. Based on the audio signal selected by the channel selector 360, the controller 350 controls the audio processor 330 to output the corresponding audio.

The shutter driver 370 opens and closes the right-eye shutter 380 and the left-eye shutter 390 of the 3D glasses 300 and 310. As for a general 3D stereoscopic image, when the external display apparatus alternately outputs the left-eye image and the right-eye image, the shutter driver 370 alternately opens and closes the right-eye shutter 380 and the left-eye shutter 390 based on the received sync signal. Furthermore, in the display apparatus 100 which alternately outputs a plurality of contents according to an exemplary embodiment, the right-eye shutter 380 and the left-eye shutter 390 may open and close concurrently. That is, based on the sync signal corresponding to the intended content among the plurality of the contents alternately output, the right-eye shutter 380 and the left-eye shutter 390 may be simultaneously opened and simultaneously closed.

Figure 5:
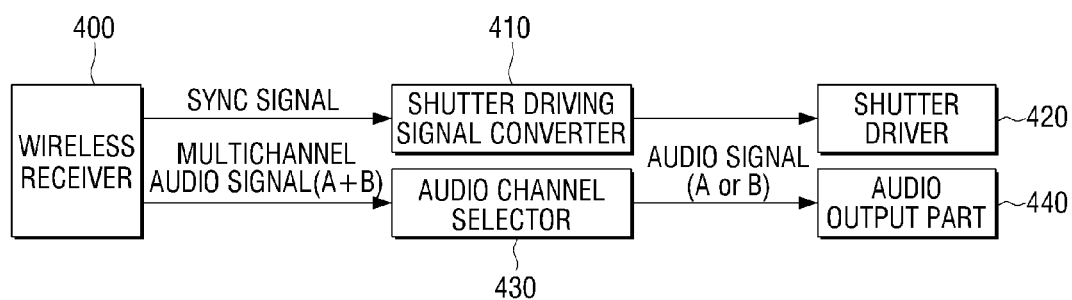
FIG. 5 is a diagram of operations of 3D glasses according to an exemplary embodiment.

Meanwhile, audio signal processing when the audio signal received from the wireless receiver 320 is the multichannel audio signal will now be explained in more detail with reference to FIG. 5. Referring to FIG. 5, 3D glasses receive a sync signal and a multichannel audio signal A+B from an external display apparatus through a wireless receiver 400. The sync signal is a signal for interworking with the external display apparatus. Operations of the 3D glasses in relation to an image output of the external display apparatus have already been provided, and a detailed description thereof is omitted herein. A shutter driver 420 controls to open and close a left-eye shutter and a right-eye shutter based on the received sync signal. A shutter driving signal converter 410 generates a signal for driving the shutters based on the received sync signal. While the shutter driving signal converter 410 is separately provided as a single component in FIG. 5, the shutter driver 420 may include the shutter driving signal converter in another exemplary embodiment. The shutter driving signal converter 410 actualizes the signal generation of the shutter driver 420 for driving the left-eye shutter and the right-eye shutter.

As for the audio signal, the audio signal A and the audio signal B are included in the multichannel audio signal A+B in FIG. 5. An audio channel selector 430 selects the audio corresponding to the intended content as stated above. For example, the channel can be selected by the user or based on the received sync signal.

The signal A or B selected by the audio channel selector 430 is transferred to the audio output part 440 and then output.

Thus, the user wearing the 3D glasses can enjoy the image and the audio of one of the contents using the external display apparatus which outputs the plurality of the contents, without distraction or interference from the image and the audio of other of the contents.

Figure 6A:
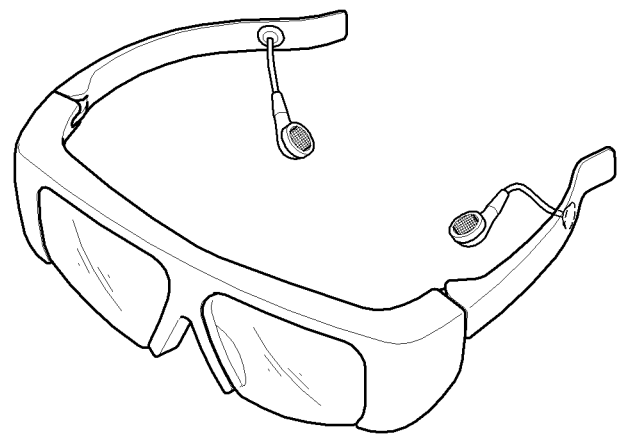
FIGS. 6A, 6B and 6C are diagrams of exemplary 3D glasses capable of outputting audio according to one or more exemplary embodiments.
Figure 6B:
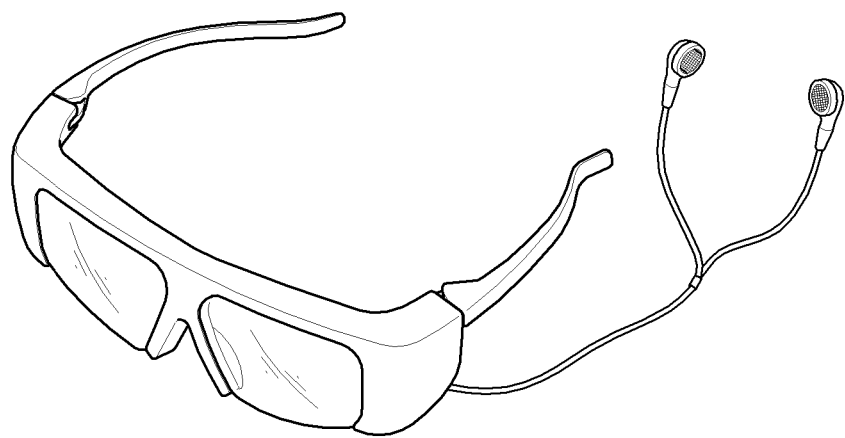
Figure 6C:
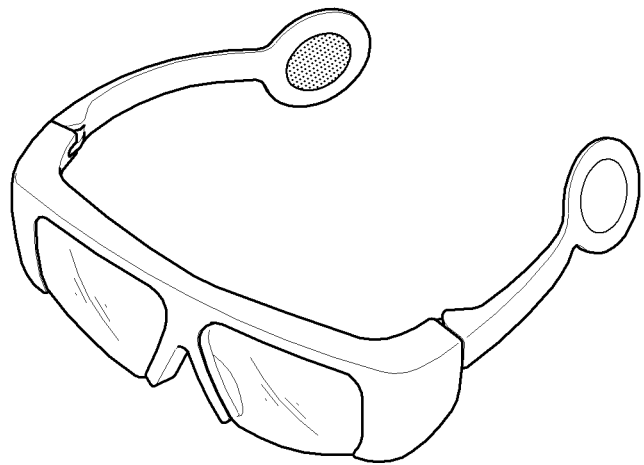

FIGS. 6A, 6B and 6C depict examples of 3D glasses capable of outputting audio according to one or more exemplary embodiments. An earphone capable of outputting the audio can be attached to a leg of the 3D glasses as shown in FIG. 6A, and earphones can be attached to the body of the 3D glasses as shown in FIG. 6B. Furthermore, headphones of FIG. 6C can provide a high-quality audio to the user.

The 3D glasses in FIGS. 6A, 6B and 6C are mere examples of shutter glasses including an audio output part, and it is understood that shutter glasses can be fabricated in different forms according to other exemplary embodiments.

According to a display apparatus and 3D glasses according to exemplary embodiments, a user can select and listen to the audio corresponding to an image being watched, through the display apparatus. Therefore, a plurality of the users can individually enjoy contents without interfering with one another.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the display apparatus 100 and the 3D glasses 300 and 310 can include a processor or microprocessor executing a computer program stored in a computer-readable medium.

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. Active shutter-type glasses which operate with an external display apparatus that alternatively displays a first content and a second content, the active shutter-type glasses comprising:
a wireless receiver which receives a sync signal, the wireless receiver configured to receive both first and second audio signals from the external display apparatus, the first audio signal associated with the first content and the second audio signal associated with the second content;
a shutter driver which drives shutters according to the received sync signal; and
an audio output part which processes one of the received first audio signal and the received second audio signal and outputs the processed one of the received first and second audio signals,
wherein the first and second audio signals are concurrently received, by the wireless receiver, in a multi-channel audio signal in which the first and second audio signals are synthesized.

2. The glasses of claim 1, wherein, when the external display apparatus displays a first image corresponding to the first content and a second image corresponding to the second content, different from the first content, the shutter driver drives the shutters based on the sync signal to represent one of the first and second images to a user.

3. The glasses of claim 2, wherein:
the first and second audio signals are of a plurality of channels respectively corresponding to the first and second images; and
the audio output part outputs the first audio signal corresponding to the first image.

4. The glasses of claim 3, further comprising:
a channel selector which receives a channel selection from the user,
wherein the audio output part outputs one of the first audio signal and the second audio signal corresponding to the channel selected through the channel selector.

5. The glasses of claim 1, wherein:
the external display apparatus alternately outputs first and second images; and
the received sync signal is a signal synchronized to an output timing of the first image.

6. The glasses of claim 1, wherein:
the shutters comprise a left-eye shutter and a right-eye shutter, and
the shutter driver concurrently opens the left-eye shutter and the right-eye shutter and concurrently closes the left-eye shutter and the right-eye shutter according to the received sync signal.

7. The glasses of claim 1, wherein the wireless receiver receives the first and second audio signals according to Zig-Bee standard.

8. Glasses which interwork with an external display apparatus, the glasses comprising:
a wireless receiver which receives a sync signal and an audio signal from the external display apparatus, the audio signal comprising a first audio signal and a second audio signal respectively corresponding to a first image and a second image;

a shutter driver which drives shutters according to the received sync signal; and an audio output part which outputs the audio signal of an image corresponding to the received sync signal, wherein the first and second audio signals are concurrently received, by the wireless receiver, in a multi-channel audio signal in which the first and second audio signals are synthesized.

9. The glasses of claim 8, wherein:

the received audio signal is a signal synthesizing, into a multichannel, the first and second audio signals respectively corresponding to the first and second images output from the external display apparatus; and the audio output part selects the first audio signal of the received multichannel first and second audio signals and outputs the selected first audio signal.

10. The glasses of claim 9, further comprising:

a channel selector which receives a channel selection from a user, wherein the audio output part outputs the first audio signal corresponding to the channel selected through the channel selector, among the multichannel first and second audio signals.

11. The glasses of claim 8, wherein:

the audio signal corresponds to the image corresponding to the received sync signal; and the audio output part outputs the received audio signal as received.

12. The glasses of claim 8, wherein:

the external display apparatus is a display apparatus which alternately outputs a first image and a second image; and the sync signal is a signal synchronized to an output timing of the first image.

13. The glasses of claim 8, wherein:

the shutters comprise a left-eye shutter and a right-eye shutter; and the shutter driver concurrently opens the left-eye shutter and the right-eye shutter and concurrently closes the left-eye shutter and the right-eye shutter according to the received sync signal.

14. A method of controlling glasses which interwork with an external display apparatus that alternately displays a first image corresponding to first content and a second image corresponding to second content, the method comprising:

receiving, by the glasses, a sync signal and an audio signal from the external display apparatus, the audio signal comprising a first audio signal and a second audio signal respectively corresponding to a first image and a second image;

driving shutters of the glasses according to the received sync signal; and outputting the audio signal of an image corresponding to the received sync signal, wherein the first and second audio signals are concurrently received, by the wireless receiver, in a multi-channel audio signal in which the first and second audio signals are synthesized.

15. A non-transitory computer readable recording medium having recorded thereon a program executable by a computer for performing the method of claim 14.

* * * * *